Patented May 14, 1946

2,400,115

UNITED STATES PATENT OFFICE 2,400,115

RECOVERY OF NICKEL AND/OR COBALT FROM NICKELIFEROUS ORES

Robert C. Hills and Maurice F. Dufour, New York, N. Y., assignors to Nicaro Nickel Company, New York, N. Y., a corporation of Delaware No Drawing. Application October 14, 1942, Serial No. 461,993

5 Claims. (Cl. 75—82)

This invention relates to the recovery of nickel and cobalt from nickeliferous ores containing iron and, more particularly, to the recovery of such metals from low grade ores which because of their small percentage of nickel (less than about 2 per cent) cannot be profitably processed by ordinary smelting processes now employed in the treatment of high grade nickeliferous ores.

It has heretofore been suggested that ores of the nature of garnierite and other high grade ores be treated for the recovery of nickel by subjecting the ore in finely divided form to a reduction at temperatures of from 700° to 1000° C., cooling in a reducing or non-oxidizing atmosphere and leaching out the nickel in an ammoniacal liquor. Such process has never been commercially employed, one reason being the non-existence of such high grade ores in large quantities and another that such high grade ore in the quantities which are available can be treated profitably by already proven processes. Furthermore, this heretofore suggested process is inefficient in removal of nickel, for in ores containing 6 to 6.5 per cent nickel, as much as 1.5 per cent could not be economically recovered.

An ultimate object of the present invention is to provide an improved process of the above type by which the nickel, and also cobalt if the same be present, can be recovered in substantially quantitative yields or yields leaving not more than about 0.2 per cent nickel content and only a small percentage of the cobalt. Another object is to provide a process which can be successfully applied on a commercial scale to ore containing as little as 2 per cent or even 1 per cent nickel. Yet another object is to increase the yield of cobalt.

In operating the above mentioned prior processes, it has been found that iron was unavoidably reduced with the nickel and hence is dissolved therewith in the ammoniacal solution, leading to loss of nickel by co-precipitation with the iron. Several methods of eliminating the iron have been suggested but none has succeeded without a sacrifice in nickel recovery. The suggested methods include (1) precipitating out the iron content from the ammoniacal leach liquor by aeration with air which unavoidably leads to loss of some of the nickel in the precipitated iron-nickel complex, and (2) selectively reducing the nickel by using combustion gases in admixture with the reducing gases in specific proportions, this procedure being only partially effective in eliminating the iron. This latter treatment may ordinarily also decrease the amount of nickel reduced and consequently also the yields obtained.

Another experimenter has suggested that increased yields of nickel can be obtained if the carbon monoxide and hydrogen absorbed during the reducing step are driven out of the hot ore during the cooling step by replacing the same with other gases which do not oxidize the metal present. This procedure is stated to assist nickel recovery by preventing oxidation in the cooled reduced ore before solution in the ammoniacal liquor is effected, which liquor containing the nickel in solution is relieved of its dissolved iron content by blowing with air and precipitating it as $Fe(OH)_3$.

An immediate object of the present invention is to obtain increased yields of nickel and cobalt from reduced ore by converting substantially all of the soluble iron content into an insoluble form prior to the ammoniacal leaching operation, thereby eliminating the necessity for the above mentioned precipitating step or any equivalent step for the removal of iron from the solution and the consequent nickel loss.

Specifically considered, the invention may be said to involve reoxidation of the metallic iron and/or ferrous oxide from the iron and nickel mixture in the reduced ore. Since practically all of the iron is oxidized to the insoluble stage, none is taken up by the ammoniacal leach liquor. The invention includes the discovery that the oxidation treatment may be made sufficiently severe to oxidize substantially the whole soluble iron content without oxidizing the nickel to an extent making any appreciable part of it insoluble in the leach liquor even though part of the nickel does not appear to remain in the metallic state.

The solution of the problem of removing iron from the reduced ore without loss of nickel makes it possible to alter other steps in the whole recovery process to obtain still higher yields of nickel, and if present also cobalt. In particular, the reduction conditions can be severe enough to reduce substantially all of the nickel and cobalt content and the iron also reduced presents no problem. One method of obtaining high percentages of nickel and cobalt in metallic form in the reduced ore from which the soluble iron can be successfully and economically removed by the operation of the present invention is disclosed in the copending application, Serial No. 460,127, filed September 29, 1942, by Vas Hubert Brogdon.

The present invention, therefore, in a limited embodiment includes the combination of steps involving the subjection of the ore to a reduction treatment adapted to reduce substantially all (at least 85 per cent) of the nickel mineral, and if present also most of the cobalt mineral to the metallic state, and the subjection of the reduced ore to an oxidation step adapted to oxidize the soluble iron content without oxidizing the nickel or cobalt to an extent inhibiting their solution in the ammoniacal liquor employed in the leaching operation.

The iron reoxidation step of the present invention is preferably carried out by contacting the hot reduced ore with a mild oxidizing agent, the oxidizing effect of which is controlled by the quantity introduced and the temperature of the ore during the introduction. Suitable oxidizing agents are steam and carbon dioxide and mixtures of the same, both of which gases, if the quantity and temperature are correct, provide oxidizing conditions particularly favorable to the oxidation of the iron and unfavorable to the oxidation of nickel and cobalt. The step is quite advantageously carried out by introducing the oxidizing agent in such manner as to cool the reduced mass simultaneously.

The temperature at which the reoxidation can be effected is within a wide range, within about 500 to 1400° F. Low temperatures within the range are preferred, for better control of reoxidation can be maintained and higher yields of nickel more easily obtained. Higher temperatures, however, lead to quicker dissolution of the reduced metal in the ammoniacal solution. At temperatures below the range given the reoxidation is too slow and if much below, no reoxidation occurs.

At any selected temperature within the range, the quantity of reoxidizing agent, i. e., the rate of introduction, must be correlated to effect reoxidation of substantially all of the soluble iron without oxidizing the nickel and cobalt to an extent which inhibits solution of the same in the ammoniacal solution. No numerical range of introduction rate can be given herein which would be of definitive value, for the operable rate is dependent upon many variable factors including the nature of the ore, the reduction temperature, the percentage of iron in the ore or the amount in metallic form in the reduced ore, the temperature at which the agent is introduced, the cooling effect, if any, of the agent during the reoxidation, and the composition of the reducing agent. In any specific application of the process of the present invention, operators can determine by test the optimum conditions and rate of introduction of oxidizing agent to employ. The specific examples herein set out will assist in this determination.

In order that the present invention may be more readily understood as well as its relationship to the remainder of the process steps, the whole recovery process in a preferred form with some variations will be set out.

The process is particularly applicable to the treatment of nickeliferous lateritic ores such as are found in Cuba wherein the nickel, cobalt and iron are found in the oxide, hydrated oxide and hydrated silicate form. These ores contain from one to two per cent of nickel. Parts of the deposits are limonitic in character and contain a high percentage of iron, whereas others are silicious in character and contain a low percentage of iron.

In its broader aspects however, the invention is not limited to the treatment of any particular nickeliferous-iron ores but extends to the treatment of any such ores in which the nickel and cobalt content may be converted to their respective oxides by ignition prior to or during reduction. Sulfide ores, for example, may be roasted to form the oxides before reduction and hence are amenable to treatment by the present invention.

In preparing the ore for the recovery treatment it may first be dried and then ground or crushed to 60 mesh or lower degree of fineness. Thereafter, the finely divided ore is subjected to a reducing roast in which the action is accomplished by producer gas, water gas, cracked natural gas, or any other suitable reducing agent either gaseous or solid. The reduction operation may be accomplished either by directly heating the ore in the reduction atmosphere in which combustion gases are mixed with the reducing gas, or by preheating the ore to the proper temperature by any suitable means and thereafter subjecting it to the action of the reducing agent. In the treatment of silicate ores, efficient action is obtained by preigniting the ore to a temperature of about 1000° F. and then employing a combination of combustion and reduction gases. The reduction treatment is carried out under conditions which insure substantially complete conversion of the nickel and cobalt minerals to their respective metallic states, such result being obtained by employing sufficient reducing gas and an adequate time of treatment.

The time and temperature of treatment necessary for optimum reduction vary in accordance with the nature of the ore treated and with the composition of the selected reducing mixture of gas, or gases. When producer gas is employed as the reducing agent, temperatures between 1000° and 1400° F. are ordinarily suitable. When such temperatures are employed a reduction time of from 60 to 200 minutes is generally sufficient. Higher temperatures or longer reduction periods may be employed but they are of little or no advantage from the standpoint of economy. During this reduction treatment a portion of the iron content of the ore is invariably and unavoidably reduced to a point where it is soluble in ammoniacal liquor, that is to the metallic state or to the monoxide stage. For reasons of economy in operation, the reduction step should be carried out in such manner as to restrict the reduction of iron to the soluble state to as low a point as possible which does not at the same time lessen the reduction of the nickel and cobalt content.

The reduction operation may be carried out to produce maximum reduction of nickel and cobalt with minimum reduction of iron by raising the temperature to a point between 1000° and 1400° F. during the reduction treatment at a gradual rate of 6–10° F. per minute, and maintaining sufficient reduction or producer gas in the mass to reduce the nickel oxide immediately upon or quickly after its formation by thermal decomposition of the silicate minerals, i. e., before the nickel oxide has had an opportunity to or does polymerize and become inactive with respect to the reducing gases. This process is described in the hereinbefore mentioned copending application of Vas Hubert Brogdon. The amount of iron reduced to the soluble state may also be minimized by employing a reducing gas composed of a proper mixture of carbon monoxide to carbon dioxide and/or hydrogen to water vapor.

After completion of the reduction operation, the ore is cooled preferably to a temperature of about 700–800° F. whereupon steam is introduced into the ore in a quantity and for a period which reoxidizes substantially all of the iron present without reoxidizing the nickel and cobalt to an extent which will interfere with their subsequent leaching with ammoniacal liquor, the time of introduction satisfactorily being a period of a few minutes up to about 15 minutes. During this period, the temperature of the ore is preferably allowed to fall to 400–500° F. Instead of steam, a mixture of steam and hydrogen may be employed. Furthermore, carbon dioxide may be used for the same purpose but it is preferably introduced at a higher temperature, for example, nearer 1100° F., the gas being introduced for a substantially longer period of time, for example, 20 to 60 minutes.

Since the various oxidizing agents are operable at different temperature ranges, a single operable range for all such agents cannot be given. The operable range for any particular oxidizing agent may be considered as to the upper limit, a temperature which is sufficiently low to avoid oxidation of nickel to an extent inhibiting leaching in ammonical solutions, and as to the lower limit, a temperature capable of oxidizing the soluble iron into an insoluble form at a commercially acceptable rate. As to this lower limit, for example, steam at 400° F. might be acceptable, whereas at 200° F., it might not be acceptable because of the time required to complete the desired oxidation.

When the reoxidation step is complete, the ore is cooled to a temperature of approximately 100° to 150° F., preferably in an oxygen-free atmosphere. Thereafter, the cooled mass is mixed with an aqueous ammoniacal solution, the proportion used being sufficient to form a free flowing pulp which may be conveniently handled in subsequent operations. Any of the ammoniacal liquors described in the prior art may be employed in this step, but the preferred liquor contains basic ammonium compounds inasmuch as their volatility facilitates their later recovery for reuse in the process. The preferred liquor for most ores is composed of an aqueous solution containing six per cent of ammonia by weight, three per cent of which is present as the hydroxide and three per cent as the carbonate. The ammoniacal pulp obtained is then aerated to effect dissolution of the cobalt and nickel, oxygen being necessary to bring about this result. From the aerated solution the nickel and cobalt may be recovered in the form of precipitated carbonates or hydroxides, or a mixture of the two, by distilling off the ammonia. The cobaltic content may be separated from the nickel content by the process defined in the copending application, Serial No. 458,136, filed September 12, 1942, by Myrl H. Lichtenwalter. The ammonia distilled off in the precipitation treatment may be recovered and used again in the process.

The nickel and cobalt values may be recovered by other well known processes, such as precipitating the same with sodium sulfide, hydrogen sulfide, or the like, or by neutralizing the ammonia with acids.

The nickel and cobalt compounds obtained may be further treated to produce the pure metals therefrom by any of the already known procedures. For example, the nickel precipitate may be dried and calcined to the oxide stage and after reduction, the metal may be separated by the well known Mond carbonyling process. The metals may also be separated by dissolving the precipitate in acid and selectively precipitating the cobalt by chlorine oxidation.

*Example*

500 grams of a nickeliferous iron ore of limonitic character containing 72.05 per cent ferric oxide, 1.57 per cent nickel oxide, and 0.12 per cent cobalt oxide, together with other minerals which do not interfere with the operation of the present process, were ground to a fineness of approximately 100 mesh and preheated in an externally heated vertical retort to 1200° F. in the presence of flue gases. Thereupon, producer gas was passed up through the vessel for a period of one hour during which period the ore was agitated to facilitate contact of the gas with the ore particles and the temperature was maintained between 1190° and 1210° F. After the reduction step the charge was cooled to 800° F. in the presence of the reducing gas, whereupon wet steam was introduced into the vessel at the rate of 0.1 gram mols per minute for a period of 16 minutes. The ore charge was cooled during the treatment with steam by means of an air blast directed upon the exterior of the reaction vessel. When the temperature of the ore reached about 400 F. the steaming was discontinued and the mass was cooled rapidly to 100° F. by chilling the vessel with water. In order to avoid the development of a vacuum due to the condensation of steam a small amount of nitrogen was introduced into the vessel during the final phase of cooling.

The cooled ore was then mixed with an ammoniacal solution hereinbefore described, the proportion of solid to liquid preferably being about 1 to 3 by weight. Thereupon, the pulp was aerated with air at the rate of 100 cc. per minute for 2 hours, after which the solids were filtered off and mixed with a fresh supply of ammonia liquor. A second 2 hours aeration was carried out and then the operation was repeated for a third and final time. The solids obtained from the third aeration were then washed with water. The three leaching liquors obtained together with the wash water were then steam distilled to remove the ammonia thereby precipitating the nickel and cobalt values. The precipitate was then separated from the water by simple filtration, whereupon it was washed and dried at a temperature of 105° C. An analysis of the nickel-cobalt concentrate obtained revealed 50.27 per cent nickel, 3.05 per cent cobalt, and 0.22 per cent iron, the remainder being combined carbon dioxide and water. The yield of nickel was 90.2 per cent and that of cobalt 68.0 per cent.

In order to illustrate the effectiveness of the reoxidation step, a similar run was carried out omitting the reoxidation step. In this run, however, a fourth aeration step, the same as the first three, was added to raise the yield of extracted nickel from 75.4 per cent to 87.4 per cent. The nickel-cobalt concentrate obtained by this run on analysis was found to contain 45.8 per cent nickel, 1.15 per cent cobalt, and 3.72 per cent iron, the remainder being combined carbon dioxide and water. When the comparatively higher percentage of iron in this concentrate was precipitated out by an aeration step, it was found that a portion of the nickel was unavoidably precipitated together with the ferric ammonium carbonate which in turn hydrolyzed to the insoluble hydroxide, an analysis of hydroxide revealing 47 per cent iron and 6.24 per cent nickel. The nickel yield was 87.4 per cent while the cobalt yield was only 25.6 per cent.

The results obtained by the above runs clearly show the improvement in yields following the use of the reoxidation step. The increase in yield of nickel amounts to the appreciable amount of 2.8 per cent whereas the increase in yield of cobalt amounts to the very substantial and surprising amount of 43.4 per cent.

The instant process wherein the soluble iron is substantially wholly eliminated before the leaching step is effected, has several outstanding advantages over the above illustrated prior process. Among the advantages are the following:

1. Larger recoveries of nickel and cobalt are obtained.

2. That portion of the air heretofore introduced into the leach liquor to precipitate the iron is either completely eliminated or is substantially decreased. Hence, in the processing apparatus the size of the air ducts, compressors, turbo-aerators, and ammonia recovery system may be decreased. Furthermore, the ammonia losses are decreased.

3. The oxidation step very materially increases the dissolution rate of nickel and cobalt and hence speeds up the recovery process. When limonite ore is treated and the reoxidation step is employed, 76 per cent of the nickel is obtained in 2 hours, 86 per cent in 4 hours, and 89 per cent in 6 hours. In contrast thereto, when reoxidation is not employed, only 15 per cent is obtained after 2 hours of aeration, 30 per cent after 4 hours, and 44 per cent after 6 hours.

When serpentine ore is treated and reoxidation employed, 70 per cent of the nickel is dissolved in 2 hours, 80 per cent in 4 hours, and 85 per cent in 6 hours. In contrast thereto, when no reoxidation is employed in a corresponding run, only 23 per cent of the nickel is dissolved after 2 hours of aeration, only 43 per cent after 4 hours, and 60 per cent after 6 hours.

The reason why the increased dissolution rate is obtained has not been definitely ascertained but apparently the iron-nickel alloy in the reduced ore is decomposed by the reoxidation and the nickel is freed in such form that it presents a greater surface for reaction with the ammoniacal solution. Possibly also the reoxidation prevents the formation of surface coatings of iron hydroxide which may hinder dissolution of nickel and cobalt.

The increase in nickel recovery is economically of considerable importance. The increase in cobalt recovery is very substantial and amounts to as much as 0.4 pounds per ton of ore treated, this increase in recovery being also very material from the economic standpoint in the commercial operation of the process.

It should be understood that the present invention is not limited to the specific details herein set out but that it extends to all equivalent materials, conditions and procedures which will occur to those skilled in the art upon consideration of the claims appended hereto.

We claim:

1. The process of recovering the nickel content from iron-bearing nickeliferous ores in the oxidic state, which comprises subjecting the ore to the action of reducing gases at temperatures between 1000° F. and 1500° F. whereby the nickel content is substantially wholly reduced to the metallic form and the iron content is in part unavoidably also reduced to a form soluble in ammoniacal leach liquors, subjecting the reduced ore to a mild reoxidation of an intensity which reoxidizes the soluble iron content to a state insoluble in ammoniacal leach liquors and the metallic nickel content to a state in which it is more readily soluble in such liquors, and thereafter subjecting the resulting treated ore after cooling, to aeration leaching with an ammoniacal leach liquor whereby a substantially iron-free product leach liquor is obtained containing the reduced and reoxidized nickel content.

2. A process for recovering nickel and cobalt from oxidic iron-bearing ores containing such metals which comprises subjecting the ore to the action of reducing gases at temperatures between 1000 and 1500° F. whereby the desired metal content is substantially wholly reduced to the metallic form and the iron content is in part unavoidably also reduced to a form soluble in ammoniacal leach liquors, partially cooling the reduced ore in a non-oxidizing atmosphere and subjecting the reduced ore to a mild reoxidation of an intensity which reoxidizes the soluble iron content to a state insoluble in ammoniacal leach liquors and the reduced metal content to a state in which it is more readily soluble in such liquors, and thereafter subjecting the resulting treated ore to aeration-leaching with an ammoniacal leach liquor whereby a substantially iron free product leach liquor is obtained containing the reduced and reoxidized metal content.

3. The process of recovering the nickel content from oxidic iron-bearing nickeliferous ores which comprises subjecting the ore to the action of a reducing gas mixture which substantially wholly reduces the nickel content to the metallic state and the iron content in part unavoidably to a form soluble in ammoniacal leach liquors at temperatures between 1000 and 1400° F. subjecting the reduced ore to a mild reoxidation of an intensity which reoxidizes the soluble iron content to a state insoluble in ammoniacal leach liquors and the metallic nickel content to a state in which it is more readily soluble in such liquors, and thereafter subjecting the resulting treated ore after cooling to aeration-leaching with an ammoniacal leach liquor whereby a substantially iron free product leach liquor is obtained containing the reduced and reoxidized nickel content.

4. The process of recovering nickel and cobalt from oxidic nickeliferous ores containing iron and cobalt which comprises subjecting the ore to the action of reducing gases at temperatures between 1000 and 1400° F. whereby the nickel and cobalt contents are substantially wholly reduced to the metallic form and the iron content is in part unavoidably also reduced to a form soluble in ammoniacal leach liquors, subjecting the reduced ore to a mild reoxidation of an intensity which reoxidizes the soluble iron content to a state insoluble in ammoniacal leach liquors and the metallic nickel content to a state in which it is more readily soluble in such liquors, and thereafter subjecting the resulting treated ore after cooling to aeration-leaching with an ammoniacal leach liquor whereby a substantially iron free product leach liquor is obtained containing the reduced and reoxidized nickel content.

5. The process of speeding up the recovery of the nickel content from nickeliferous lateritic iron-bearing ores in a leach liquor substantially free of dissolved iron which comprises subjecting the ore to the action of reducing gases at temperatures between 1000 and 1400° F. whereby the nickel content is substantially wholly reduced to the metallic form and the iron content is in part unavoidably also reduced to a form soluble in ammoniacal leach liquors, subjecting the reduced ore to a mild reoxidation of an intensity which reoxidizes the soluble iron content to a state in which it is more readily soluble in such liquors, cooling the mass and thereafter subjecting the resulting treated ore to aeration-leaching with an ammoniacal leach liquor whereby a substantially iron free product leach liquor is obtained containing the reduced and reoxidized nickel content.

ROBERT C. HILLS.
MAURICE F. DUFOUR.